May 3, 1949.   J. A. POTTER   2,469,176
CURRENT SUPPLY APPARATUS
Filed April 18, 1946
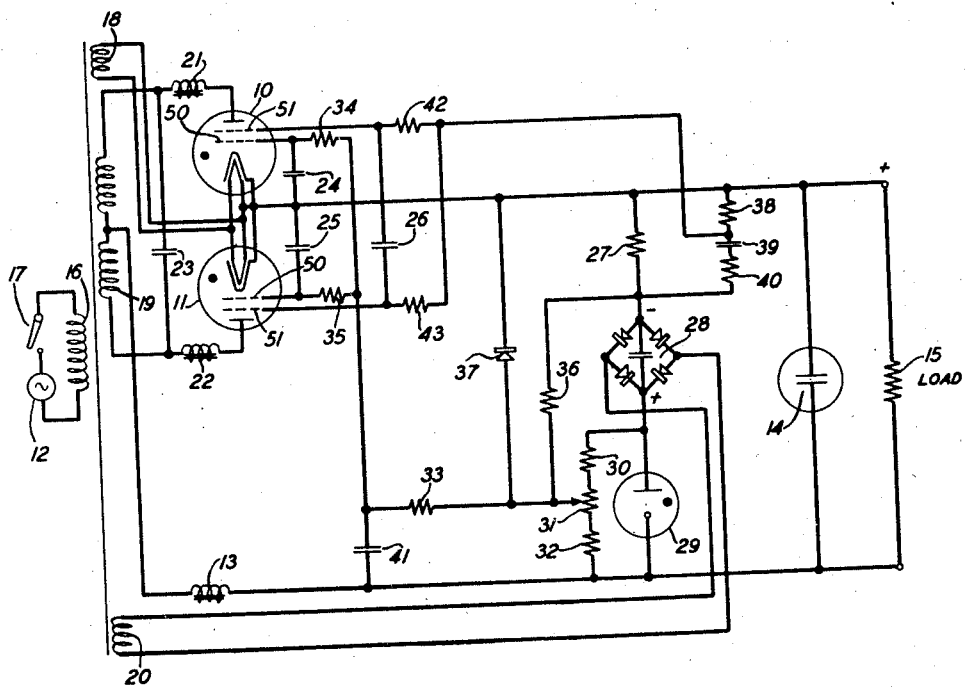
INVENTOR
J. A. POTTER
BY
*E. F. Heuerman*
ATTORNEY Patented May 3, 1949

2,469,176

UNITED STATES PATENT OFFICE 2,469,176

CURRENT SUPPLY APPARATUS

James A. Potter, Rutherford, N. J., assignor to Bell Telephone Laboratories, Incorporated, New York, N. Y., a corporation of New York Application April 18, 1946, Serial No. 662,953

8 Claims. (Cl. 175—363)

This invention relates to current supply apparatus and particularly to a regulated rectifier for supplying rectified current to a load.

An object of the invention is to provide improved means for delaying the flow of space current in a space discharge device, while the cathode of the device is being heated to operating temperature.

Another object is to provide apparatus for supplying current to a load having improved means for minimizing load voltage changes.

In a specific regulated rectifier herein shown and described for the purpose of illustration, there is provided for supplying rectified current to a load a main rectifier employing two space discharge rectifier tubes each having an anode, a cathode and two control electrodes, these devices preferably being of the gas-filled type. There is connected across the load a shunt current path comprising an auxiliary rectifier, a resistor for connecting the negative terminal of the auxiliary rectifier to the positive load terminal, that is, to the cathodes of the main rectifier tubes, and a cold cathode, gas-filled, constant voltage tube, one terminal of which is connected to the positive terminal of the auxiliary rectifier and the other terminal of which is connected to the negative load terminal. The cold cathode tube is shunted by a potentiometer the adjustable tap of which is connected to one of the control electrodes of each tube of the main rectifier. The potentiometer tap is also connected to the positive load terminal through an asymmetrically conducting element or varistor. Varistors are described in an article by J. A. Becker on page 322, et seq., of "Bell Laboratories Record," for July 1940. The varistor is so poled in the circuit that, when the main rectifier tubes are non-conducting, current from the auxiliary rectifier flows through the varistor in its forward or low resistance direction to make one of the control grids of each rectifier tube positive with respect to its cathode by only a few volts.

Conduction of space current in the main rectifier tubes may thus readily be prevented by applying a negative potential to the second control grid or screen grid of each tube relative to the cathode potential. For preventing conduction in the main rectifier tubes during an initial period in which the tube cathodes are being heated to operating temperature and thus avoiding damaging the cathodes, there is provided a current path having a condenser and a resistor in series connecting the positive load terminal to the negative terminal of the auxiliary rectifier, one terminal of the resistor being connected to the screen grid of each of the main rectifier tubes. As the condenser is charged by current from the auxiliary rectifier through a circuit comprising the relatively low forward resistance of the varistor, there is thus supplied to the screen grid with respect to the cathode an exponentially decreasing negative biasing potential to cause conduction to be initiated in the rectifier tubes after a delay period determined by the time constant of the condenser charging circuit. The charging of the condenser continues after conduction in the rectifier tubes has been initiated to cause the load voltage to increase gradually. As the load voltage increases, the voltage across the cold cathode tube also increases until its breakdown voltage is reached. The voltage across the cold cathode tube is then maintained substantially constant. In case of short power interruptions, such that the cathodes of the main rectifier tubes remain partly heated, a charge will remain on the condenser at the time that power is restored with the result that the delay period is correspondingly reduced.

During normal operation, there is applied to the control electrode of each rectifier tube relative to the cathode a potential equal to the difference between the load voltage and a portion at least of the substantially constant voltage across the cold cathode tube for causing voltage changes across the load to be minimized. At this time the current flow through the varistor is in its reverse or high resistance direction so that the varistor does not interfere with the operation of the voltage regulating control circuit. A condenser is provided in a path connecting the screen grid of one of the rectifier tubes with the screen grid of the other tube. Current flowing in a rectifier tube which is conducting at a particular time charges the condenser so as to impress a negative potential upon the screen grid of the second tube prior to the starting of conduction therein, the tubes becoming conducting alternately. Each screen grid is thus maintained at such a potential relative to the cathode potential that conduction in each tube may be controlled effectively in response to load voltage changes.

The single figure of the drawing is a schematic view of a regulated rectifier embodying the invention.

Referring to the drawing, there is shown a main rectifier comprising gas-filled space discharge rectifier tubes 10 and 11, each having an anode, a cathode, a control grid 50 and a screen grid 51 which also serves as a control grid during a starting period. The main rectifier supplies rectified current from an alternating current supply source 12 through a ripple filter comprising series inductance element 13 and 600-microfarad electrolytic condenser 14 to a load 15. The rectifier tubes may be of the RCA 2050 type, for example. There is provided a transformer having a primary winding 16 to which current from source 12 is supplied when a switch 17 is closed and secondary windings 18, 19, and 20. Current is supplied to the cathode heaters of tubes 10 and 11 from transformer winding 18. The end terminals of transformer winding 19 are connected to the anodes of tubes 10 and 11, respectively, through inductance coils 21 and 22, respectively, and a mid-terminal of winding 19 is connected through inductance element 13 to the negative load terminal. The cathodes and cathode heaters of tubes 10 and 11 are connected to the positive load terminal. A 1-microfarad condenser 23 is connected across transformer winding 19. A 0.006-microfarad condenser 24 is provided in a path connecting a control electrode 50 of tube 10 to its cathode and a similar condenser 25 is provided in a path connecting a control electrode 50 of tube 11 to its cathode. The screen grids 51 are connected by a path comprising a 0.5-microfarad condenser 26.

There is connected across the load a shunt current path comprising in series a resistor 27 of 5,600 ohms, one terminal of which is connected to the positive load terminal, an auxiliary rectifier 28 of the varistor bridge type supplying an output of 85 volts and having its negative output terminal connected to a terminal of resistor 27, and a cold cathode, gas-filled, constant voltage tube 29, one terminal of which is connected to the positive terminal of auxiliary rectifier 28 and the other terminal of which is connected to the negative load terminal. The tube 29 may be of the RCA VR-150 type which has a substantially constant voltage drop of about 150 volts across its terminals in normal operation. Across the terminals of cold cathode tube 29 are connected in series a 4,700-ohm resistor 30, a 10,000-ohm potentiometer 31 and a 68,000-ohm resistor 32. The adjustable tap of potentiometer 31 is connected through 0.12-megohm resistor 33 and 47,000-ohm resistor 34 in series to the control grid 50 of tube 10 and through resistor 33 and 47,000-ohm resistor 35 to the control grid 50 of tube 11. There is provided a resistor 36 of 47,000 ohms in a path connecting the adjustable tap of potentiometer 31 to the negative terminal of auxiliary rectifier 28. There is provided an asymmetrically conducting device or varistor 37 of the copper-oxide type in a path connecting the adjustable tap of potentiometer 31 to the positive load terminal. The varistor is so poled that, when tubes 10 and 11 are non-conducting, current from auxiliary rectifier 28 flows through varistor 37 in its forward or low resistance direction, under which condition the varistor has a resistance of about 700 ohms. During normal operation when tubes 10 and 11 are conducting alternately, current flows through varistor 37 in the reverse or high resistance direction, under which condition the resistance of the varistor is about 85,000 ohms. There is connected across resistor 27 a path comprising in series 3.9-megohm resistor 38, one terminal of which is connected to the positive load terminal, a 4-microfarad condenser 39, and a 0.1-megohm resistor 40, one terminal of which is connected to the negative output terminal of auxiliary rectifier 28. Alternating current is supplied to auxiliary rectifier 28 from transformer winding 20. A path comprising condenser 41 of 0.2 microfarads connects the common terminal of resistors 33, 34 and 35 to the negative load terminal. The common terminal of resistor 38 and condenser 39 is connected through 47,000-ohm resistor 42 to the screen grid 51 of tube 10 and through 47,000-ohm resistor 43 to the screen grid of tube 11.

When switch 17 is closed to start the circuit in operation, heating current is supplied to the cathodes of tubes 10 and 11 and current is supplied to auxiliary rectifier 28. Rectified current from auxiliary rectifier 28 flows through a circuit comprising in series resistor 30, a portion of the winding of potentiometer 31, varistor 37 and resistor 27. The resistance of varistor 37 being relatively low, the current in this circuit is of such amplitude that there is set up across resistor 27 an electromotive force of about 30 volts. Charging current is thus supplied to condenser 39. At the time that charging current commences to flow the voltage drop across resistor 38 is about 29 volts. This voltage, which decreases exponentially with time, biases the screen grids of tubes 10 and 11 negatively with respect to the tube cathodes to prevent conduction of space current in tubes 10 and 11 during an initial starting period while the cathodes of the tubes are being heated to operating temperature, thus preventing damage to the cathodes. The varistor 37 is in the circuits connecting the control grids 50 of tubes 10 and 11 with the cathodes of the tubes. However, because of the low forward resistance of varistor 37, the positive biasing potential applied to the grids 50 is only about 4 volts so that the negative bias on grids 51 of tubes 10 and 11, due to the voltage drop across resistor 38, is sufficient to prevent conduction of space current in the tubes.

When the voltage drop across resistor 38 has decreased from 29 volts to approximately 11 volts in a period of about 17 seconds from a cold start, tubes 10 and 11 commence to pass space current. After the tubes become conducting the negative potential of screen grids 51 continues to decrease to cause the space current supplied to the load to increase gradually. About two seconds after tubes 10 and 11 start passing space current, the normal load voltage of about 135 volts is reached. The rate of increase of current supplied to the load and therefore of the load voltage, is dependent upon the rate of further charging of condenser 39. Most of the charging current during this period is due to the screen grid current, that is, the current which flows through a circuit from the anode to the screen grid of each of tubes 10 and 11 and thence through condenser 39, resistor 40, rectifier 28 and cold cathode tube 29 to the mid-tap of transformer 19.

When the sum of the load voltage and the output voltage of auxiliary rectifier 28 reaches a sufficiently high value, the voltage across cold cathode tube 29 causes it to become conducting and thereafter the voltage across the tube 29 is maintained at a substantially constant value. Moreover, during normal operation the load voltage is sufficiently high to cause current to flow through varistor 37 in its reverse or high resistance direction, its resistance being about 85,000 ohms for this condition. Because of its high resistance the varistor 37 has negligible shunting effect upon the voltage controlling circuit connecting the control electrodes 50 and the cathodes of tubes 10 and 11 and it therefore does not interfere with the operation of the regulating circuit. The control voltage in the circuit connecting the control grid 50 and the cathode of each of tubes 10 and 11 is equal to the vector sum of a voltage across load 15 and a voltage of opposite polarity across resistor 32 and a portion of potentiometer 31 in series. If the load voltage should rise by a small amount, for example, the resultant control voltage changes in a direction to make the control grids 50 relatively more negative with respect to the cathode potential of tubes 10 and 11. The increase in load voltage is thus minimized. The voltage across resistor 32 and, in series therewith, the lower portion of potentiometer 31 as viewed in the drawing, is substantially constant when the output voltage of auxiliary rectifier 28 is constant. However, when the output voltage of auxiliary rectifier 28 increases, for example, the current flowing in the circuit comprising resistor 30, the upper portion of potentiometer 31 and resistor 36 increases to cause an increase of the voltage drop across resistor 30 and the upper portion of potentiometer 31 in series. Since the voltage drop across cold cathode tube 29 is substantially constant, the voltage drop across the resistor 32 and the lower portion of potentiometer 31 decreases. Therefore, when the output voltage of auxiliary rectifier 28 increases, due to an increase in line voltage, the control grids are made relatively more negative, thus tending to prevent a rise of load voltage as a result of the increase of line voltage.

When condenser 39 is fully charged no current flows through resistor 38 so that, if the voltage drop across resistor 38 were the only source of biasing potential for the screen grids 51 during normal operation, the screen grids 51 would have zero bias with respect to the cathodes. However, when tube 10, for example, is conducting space current, there is a current flow in a circuit comprising the path between the anode and screen grid 51 of tube 10, through condenser 26, from the screen grid 51 of tube 11 to the cathode and thence through the load to the center tap of transformer winding 19. Condenser 26 is thus charged in a direction to bias screen grid 51 of tube 11 negatively with respect to the cathode. The screen grid 51 of each tube is thus maintained about one volt negative with respect to the cathodes during its non-conducting period so as to avoid interference with the starting of conduction in each tube during the positive half cycle of the anode voltage under control of the voltage in the control circuit connecting the control grid 50 and the cathode of each tube. If the line voltage should be interrupted for a relatively brief period, such that the cathodes of tubes 10 and 11 remain heated but below normal operating temperature, condenser 39 will remain partly charged. The delay period intervening between the time of restoration of the line voltage and the starting of conduction in tubes 10 and 11 is therefore correspondingly reduced.

What is claimed is:

1. In combination a space discharge device having an anode, a cathode and two control electrodes, a first circuit connecting said anode and said cathode including a load to which current from a source is supplied through said first circuit when said device conducts space current, a shunt current path connected across said load, means in said shunt path for supplying current thereto, means for connecting a first of said control electrodes to said path for impressing thereon a changing potential with respect to the potential of said cathode for preventing the flow of space current in said device during an initial period commencing at the time that the supply of current to said shunt path is initiated and for causing space current to flow subsequent to said initial period, and means for connecting the second of said control electrodes to said shunt path for impressing thereon subsequent to said initial period a potential with respect to the potential of said cathode having variations corresponding to load voltage changes for causing said load voltage changes to be minimized.

2. In combination a space discharge device having an anode, a cathode and a control electrode, a first circuit connecting said anode and, said cathode including a current source and a load to which current is supplied from said source when said device conducts space current, a shunt current path connected across said load comprising in series a gaseous discharge tube and a voltage source the voltage of which is in aiding relationship with respect to the load voltage across said current path, a second circuit connecting said control electrode and said cathode comprising a portion at least of said shunt path, and an asymmetrically conducting element in a path connected across said portion of said shunt path.

3. In combination, a space discharge device having an anode, a cathode and two control electrodes, a first circuit connecting said anode and said cathode including a load to which current is supplied from a source when said device conducts space current, the positive load terminal being connected to said cathode, a condenser, a charging circuit for said condenser comprising a second current source, an asymmetrically conducting element and a resistor, a common terminal of said resistor and said asymmetrically conducting element being connected to the positive load terminal, a circuit connecting a first of said control electrodes and said cathode including said resistor for causing to be impressed upon said first control electrode with respect to said cathode a potential for preventing conduction of space current in said space discharge device during a certain period in which said condenser is being charged, means for connecting a second terminal of said asymmetrically conducting element to the negative load terminal, thereby causing to flow through said asymmetrically conducting element, when said space discharge device is conducting, current the direction of which is opposite to the direction of said condenser charging current therethrough, and means for connecting said second terminal of said asymmetrically conducting element to the second of said control electrodes for impressing thereon a potential which varies with respect to the cathode potential in accordance with load voltage changes.

4. In combination, rectifying means comprising a space discharge device having an anode, a cathode and two space current control electrodes for rectifying current from an alternating current source and for supplying the rectified current to a load when the device is conducting, means for conditioning said device to initiate conduction therein, said means comprising means for impressing upon one of said control electrodes with respect to said cathode an exponentially decreasing negative potential, and means effective after conduction is initiated in said discharge device for impressing upon the other of said control electrodes with respect to the cathode a potential which changes in response to load voltage changes, thereby minimizing said load voltage changes.

5. In combination, rectifying means comprising two gaseous discharge devices each having an anode, a cathode and two control electrodes for rectifying current from an alternating current source and for supplying the rectified current to a load, said devices passing space current during alternate half cycles of said alternating current source respectively, means for impressing upon a first of the control electrodes with respect to the cathode of each device a potential which varies in accordance with load voltage changes for causing load voltage changes to be minimized, a condenser, means for connecting one terminal of said condenser to the second control electrode of one of said devices, means for connecting the other terminal of said condenser to the second control electrode of the other of said devices, and resistance means for connecting the second control electrode of each of said devices to the cathodes of said devices, thereby causing said condenser to be charged to apply to the second control electrode of said devices alternately during non-conducting intervals thereof a negative potential with respect to the cathodes of said devices.

6. In combination, rectifying means comprising two gaseous space discharge devices each having an anode, a cathode and two control electrodes for rectifying current from an alternating current source and for supplying the rectified current to a load, the cathodes of said devices being connected to the positive load terminal, a shunt current path connected across the load comprising in series a first resistor having one of its terminals connected to the positive load terminal, an auxiliary rectifier energized by current from said source having its negative output terminal connected to the other terminal of said resistor and a gaseous discharge tube having one of its terminals connected to the positive output terminal of said auxiliary rectifier and its other terminal connected to the negative load terminal, a current path connected across said first resistor comprising in series a second resistor and a condenser, a potentiometer in a path connected across said gaseous discharge tube, means for connecting a point on said potentiometer to a first control electrode of each of said space discharge devices, an asymmetrically conducting device in a path connecting said point on said potentiometer and the positive load terminal, thereby completing a circuit for charging said condenser by current from said auxiliary rectifier, said charging current flowing through said asymmetrically conducting element in its forward or low resistance direction, and means for completing a circuit connecting the second control electrode and the cathode of each of said space discharge devices, said circuit including said second resistor.

7. A combination in accordance with claim 6 in which means are provided for supplying current from said source for heating the cathodes of said space discharge devices, the potentials impressed upon said control electrodes with respect to the cathode potential of each space discharge device being such as to prevent the flow of space current in each space discharge device during a period in which said cathodes are being heated to operating temperature.

8. In combination, rectifying means comprising a space discharge device having an anode, a cathode and two space current control electrodes, a circuit comprising the space current path of said discharge device and a load in series through which circuit rectified current is supplied to said load when a voltage from an alternating voltage source is supplied to said circuit and when said device has been conditioned for conduction, a first means for causing said device to be conditioned for conduction after a delay period following the initiation of supply of voltage from said alternating source to said means, said means comprising means for impressing upon one of said control electrodes with respect to said cathode an exponentially decreasing negative potential, means for simultaneously initiating the supply of voltage from said source to said circuit and to said first means, and means effective after conduction is initiated in said dicharge device for impressing upon the other of said control electrodes with respect to the cathode a potential for controlling the current supplied to the load.

JAMES A. POTTER.

REFERENCES CITED

The following references are of record in the file of this patent:

UNITED STATES PATENTS

| Number | Name | Date |
| --- | --- | --- |
| 1,939,462 | Ramsay | Dec. 12, 1933 |
| 2,373,750 | Faulkner | Apr. 17, 1945 |
| 2,390,151 | Johnston | Dec. 4, 1945 |
| 2,414,122 | Potter | Jan. 14, 1947 |